United States Patent
Hong et al.

(10) Patent No.: US 8,325,360 B2
(45) Date of Patent: Dec. 4, 2012

(54) IMAGE FORMING APPARATUS AND IMAGE FORMING METHOD

(75) Inventors: Seung-wook Hong, Hwaseong-si (KR); Seok-won Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1007 days.

(21) Appl. No.: 12/266,747

(22) Filed: Nov. 7, 2008

(65) Prior Publication Data

US 2009/0161151 A1 Jun. 25, 2009

(30) Foreign Application Priority Data

Dec. 20, 2007 (KR) .................. 10-2007-0134593

(51) Int. Cl.
*G06F 15/00* (2006.01)
*G06F 15/173* (2006.01)
(52) U.S. Cl. ....................... 358/1.15; 709/225
(58) Field of Classification Search ........... 358/1.15, 358/1.13, 1.14, 1.9, 539; 709/219, 217, 218, 709/206, 223, 227; 455/557, 566; 370/254
See application file for complete search history.

(56) References Cited

U.S. PATENT DOCUMENTS

| 6,384,930 | B1 * | 5/2002 | Ando | 358/1.17 |
| 2008/0094650 | A1 * | 4/2008 | Suzuki | 358/1.12 |

FOREIGN PATENT DOCUMENTS

| JP | 2004-280417 | 10/2004 |
| JP | 2006-192760 | 7/2006 |

OTHER PUBLICATIONS

Korean Office Action mailed Apr. 26, 2012 issued in corresponding Korean Patent Application No. 10-2007-0134593.

* cited by examiner

*Primary Examiner* — Saeid Ebrahimi Dehkordy

(74) *Attorney, Agent, or Firm* — Staas & Halsey LLP

(57) ABSTRACT

An image forming apparatus and method of printing an image in the image forming apparatus connected to an image storage device, the method including: selecting at least one image stored in the image storage device; setting up print options with regard to the selected at least one image; starting a transmission of image data corresponding to the selected at least one image from the image storage device to the image forming apparatus before the setting up of the print options is completed; and printing the image data according to the setup print options.

26 Claims, 4 Drawing Sheets

IMAGE FORMING APPARATUS AND IMAGE FORMING METHOD

CROSS-REFERENCE TO RELATED APPLICATION

This application claims the benefit of Korean Patent Application No. 2007-134593, filed Dec. 20, 2007, in the Korean Intellectual Property Office, the disclosure of which is incorporated herein by reference.

BACKGROUND OF THE INVENTION

1. Field of the Invention

Aspects of the present invention relate to an image forming apparatus and an image forming method, and more particularly, to an image forming apparatus and an image forming method that receive an image from an image storing unit.

2. Description of the Related Art

Generally, an image forming apparatus forms an image based on print data. In detail, the image forming apparatus forms the image on a print medium according to a document file created through an application program provided by a host system (such as a personal computer) or according to image data generated by an image storing unit (such as a digital still camera or the like).

Conventionally, when the data generated by the digital still camera is transmitted to the host system, the host system processes and converts the received data to a printable format and transmits the converted data to the image forming apparatus, thereby allowing the image forming apparatus to print the data. Recently, a photo printer has been developed to directly receive and print the image data from the digital still camera through a wired and/or a wireless connection (such as a universal serial bus (USB), Bluetooth, etc.) without depending on the host system. Moreover, an image forming apparatus has been developed to directly connect to a portable phone having an image-sensing function and to print the image data generated by the portable phone.

Specifically, when a user selects an image to be printed in the digital still camera, the image forming apparatus receives the image data corresponding to the selected image from the digital still camera, and processes the image data to thereby print the image. If a user selects two or more images to be printed, the image forming apparatus repeats the foregoing operations with respect to each selected image.

A PictBridge protocol is an example of a standard protocol for printing an image through such a connection between the digital still camera and the image forming apparatus. Using the PictBridge protocol, the image forming apparatus receives the image data from the digital still camera and forms an image, as will be described with reference to FIG. 1.

FIG. 1 illustrates a conventional image forming apparatus that receives image data from a digital still camera and prints an image corresponding to the image data. Referring to FIG. 1, when the digital still camera and the image forming apparatus are connected to each other, a digital photo solutions (DPS)_Discovery initialization function is executed to check information about whether the digital still camera and the image forming apparatus support the PictBridge protocol, information about a product number and a support function of the digital still camera, etc.

Then, a DPS_ConfigurePrintService function is executed to allow the digital still camera to inform the image forming apparatus that the digital still camera functions as a server while storing the image data and functions as a client while printing the image. On the other hand, the image forming apparatus functions as a server while performing the printing, and functions as a client while receiving the stored image data.

Then, a user selects an image to be printed from among the stored images and sets up a printing option through a user interface of the digital still camera. The printing options supported by the image forming apparatus can be shown by executing a DPS_GetCapability function. According to a user's input, a DPS_StartJob function causes the digital still camera to transmit to the image forming apparatus a print command along with information such as the number of images to be printed, the number of copies, a file name, and the printing option.

The image forming apparatus receives the print command from the digital still camera and requests, from the digital still camera, file information about the image to be printed (DPS_StartJob). After receiving the file information (File info), the image forming apparatus requests the image data (DPS_GetFile) from the digital still camera. In response, the digital still camera transmits the image data (Image File) to the image forming apparatus, and the image forming apparatus stores the received image data in a storage medium. Then, the image forming apparatus converts the image data into a format suitable for printing, and thereby prints the image. The image forming apparatus notifies the digital still camera with a status of a print job for the current image data (i.e., information about whether the printing is in progress, the printing is completed, etc.) (DPS_NotifyDeviceStatus and DPS_NotifyJobStatus).

However, conventionally, when a user selects an image to be printed and sets up a print option corresponding to the selected image in the digital still camera through the PictBridge protocol, the image data is transmitted to the image forming apparatus after both the image selection and the print option setup are completed. As a result, transmission of the image data is delayed and time taken in the printing is prolonged.

SUMMARY OF THE INVENTION

Aspects of the present invention provide an image forming apparatus and an image forming method, in which image data is transmitted before print options of an image corresponding to the image data are completely set up, thereby reducing a user's waiting time for printing.

Aspects of the present invention also provide an image forming apparatus and an image forming method, in which an image storage device is notified of a print state of an image.

According to an aspect of the present invention, there is provided an image forming method to print an image by an image forming apparatus connected to an image storage device storing the image, the method including: selecting at least one image stored in the image storage device; setting up print options with regard to the selected at least one image; starting a transmission of image data corresponding to the selected at least one image from the image storage device to the image forming apparatus before the setting up of the print options is completed; and printing the image data according to the setup print options.

The printing the image data may include printing the image data directly from the image storage device without connecting to a host system or another terminal.

The image forming method may further include notifying the image storage device of a print job status for the image data.

The image forming method may further including displaying a print job status for the image data on the image forming apparatus.

When a user inputs a print start command during the transmission of the image data, the transmission of the image data may be paused, a received portion of the image data may be printed while the transmission is paused, and the transmission may resume after the received portion of the image data is printed.

The image forming method may further include asking a user whether to maintain a connection between the image storage device and the image forming apparatus or to disconnect the connection between the image storage device and the image forming apparatus.

The image forming method may further include disconnecting the image storage device from the image forming apparatus if the user selects to disconnect the connection between the image storage device and the image forming apparatus.

The selecting of the at least one image may include checking what print options are supported by the image forming apparatus from among the print options supported by the image storage device before the at least one image is selected.

According to another aspect of the present invention, there is provided an image forming apparatus connected to an image storage device, the image forming apparatus including: a communication unit to receive image data for at least one image stored in the image storage device and selected to be printed; an image forming unit to print the received image data; a controller to control the communication unit to start to receive the image data corresponding to the at least one image from the image storage device before print options with regard to the at least one image are completely setup, and to control the image forming unit to print the received image data according to the setup print options.

The image forming unit may print the image data directly from the image storage device without connecting to a host system or another terminal.

The controller may notify the image storage device of a print job status for the image data through the communication unit.

The controller may display a print job status for the image data on the image forming apparatus.

When a user inputs a print start command during the reception of the image data, the controller may control the communication unit to pause the reception of the image data, control the image forming unit to print a received portion of the image while the reception of the image data is paused, and control the communication unit to resume the reception of the image data after the received portion is printed.

The controller may ask a user whether to maintain a connection between the image storage device and the image forming apparatus or to disconnect the connection between the image storage device and the image forming apparatus.

The controller may disconnect the connection between the image storage device and the image forming apparatus if the user selects the image storage device to be disconnected from the image forming apparatus.

The controller may check what print options are supported by the image forming apparatus from among the print options supported by the image storage device before the at least one image is selected.

According to another aspect of the present invention, there is provided an image forming system to print stored image data, the system including: an image storage device to store the image data for at least one image stored in the image storage device and selected to be printed; and an image forming apparatus to connect to the image storage device and to print the image data, the image forming apparatus including: a communication unit to receive the image data from the image storage device, an image forming unit to print the received image data, and a controller to control the communication unit to start to receive the image data from the image storage device before print options with regard to the at least one image are completely setup, and to control the image forming unit to print the received image data according to the setup print options.

According to another aspect of the present invention, there is provided an image forming apparatus connected to an image storage device, the image forming apparatus including: a communication unit to receive image data for at least one image stored in the image storage device and selected to be printed; and a controller to control the communication unit to start to receive the image data corresponding to the at least one image from the image storage device before print options with regard to the at least one image are completely setup.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
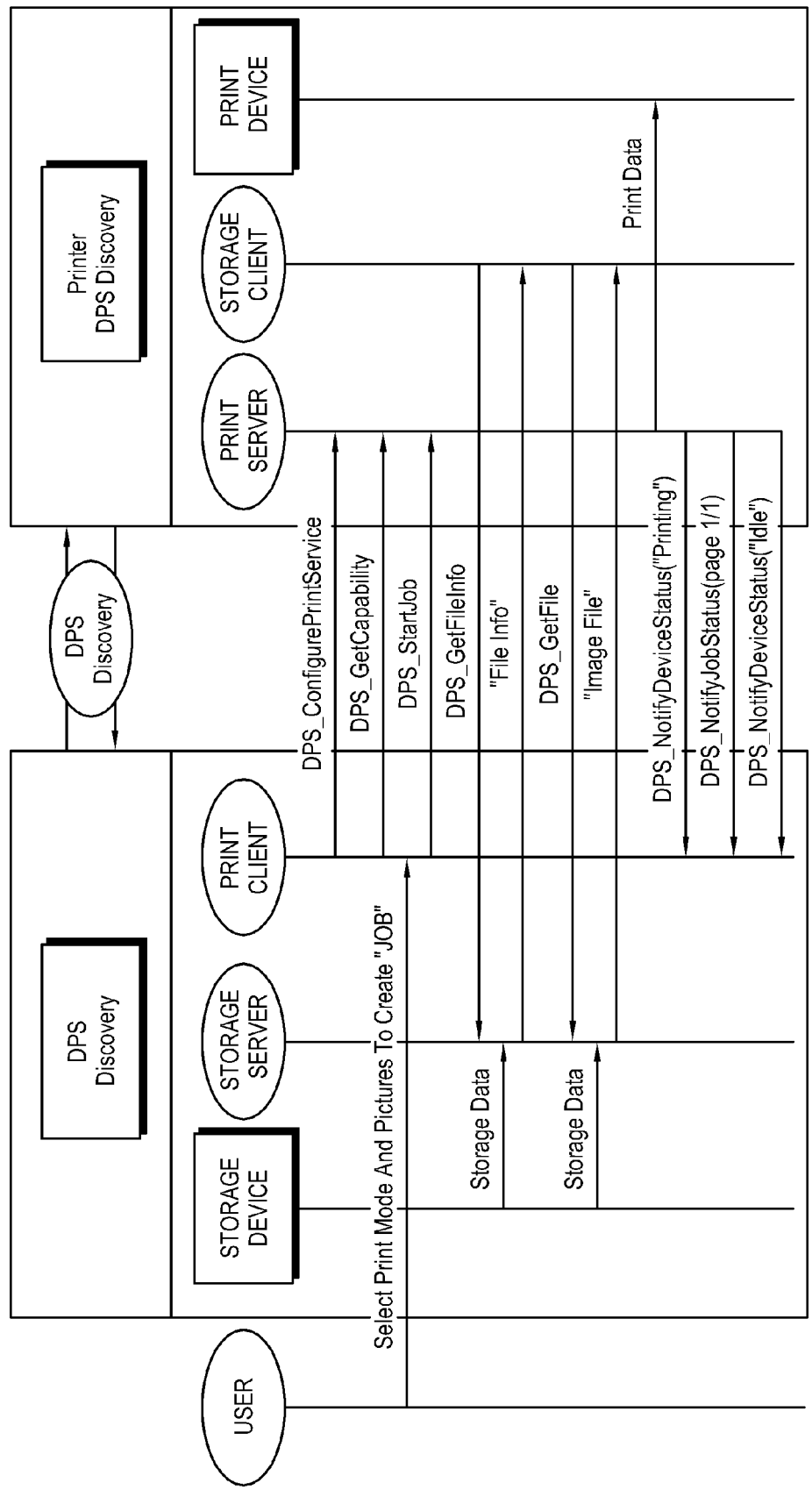
FIG. 1 illustrates a conventional image forming apparatus that receives image data from a digital still camera and prints an image corresponding to the image data.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
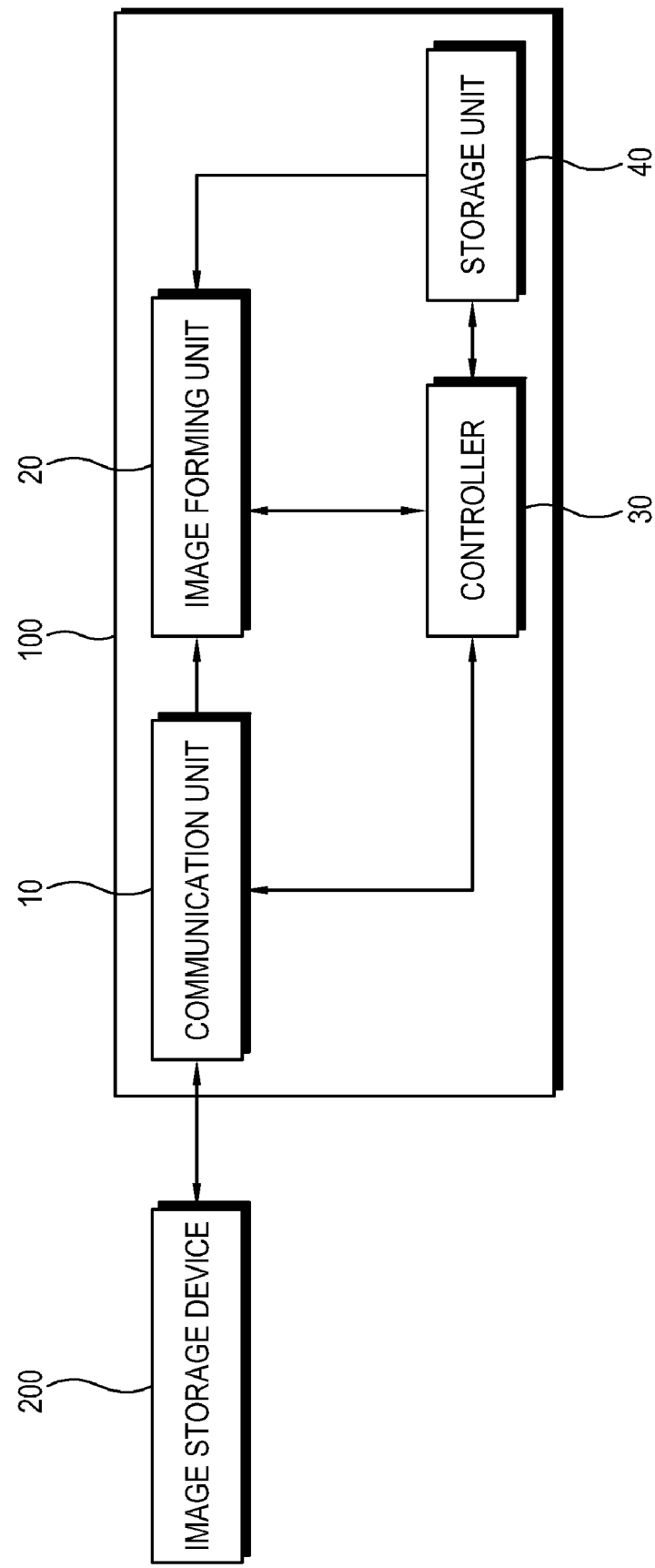
FIG. 2 is a block diagram of an image forming apparatus according to an embodiment of the present invention.

FIG. 2 is a block diagram of an image forming apparatus 100 according to an embodiment of the present invention. Referring to FIG. 2, the image forming apparatus 100 includes a communication unit 10, an image forming unit 20, a controller 30, and a storage unit 40.

The communication unit 10 receives print data from an image storage device 200 through a wired and/or a wireless connection. For example, the communication unit 10 may employ a universal serial bus (USB) connection, Bluetooth, etc., to receive the image data. Additionally, the image forming apparatus 100 and the image storage device 200 may connect by docking.

The image storage device 200 may be a mobile device (such as a digital still camera, a portable phone, a digital camcorder, a personal digital assistant (PDA), and a portable memory), a server, a host system, etc. that can store image data. The digital still camera will be described as the image storage device 200 by way of example, though it is understood that aspects of the present invention are not limited thereto.

According to an aspect of the present invention, the communication unit 10 may use a PictBridge protocol to receive the image data from the image storage device 200. The PictBridge protocol allows the image forming apparatus 100 to directly print an image from the digital still camera without connecting to a host system, a terminal, or the like.

The image forming unit 20 forms an image based on the image data. For example, the image forming unit 20 may include a photosensitive body (not shown) to form an electrostatic latent image thereon; a developing unit (not shown) to develop an image with a developer on the photosensitive body; a transferring unit (not shown) to transfer the developer corresponding to the image from the photosensitive body on a print medium (such as paper, a transparency, etc.).

Additionally, the image forming unit 20 may include a renderer to perform data rendering to output the image onto the print medium; and a parser to parse an image format file (such as joint photographic experts group (JPEG), tagged image file format (TIFF), etc.), a text format file, and/or a portable document format (PDF) file.

The controller 30 controls the communication unit 10 to receive a portion or an entirety of the image data corresponding to a selected image from the image storage device 200 before a print option of the selected image in the image storage device 200 is completely setup (for example, immediately after the image is selected), and controls the image forming unit 20 to print the received image data on the basis of the setup print option. Here, the print option may include a number of copies with respect to an image, information regarding one or more margins of the image, a number of images to be shown on one page, etc. Operations of the controller will be described in more detail with reference to FIG. 3.

The storage unit 40 stores the image data received from the image storage device 200. The storage unit 40 may include a non-volatile memory (such as a flash memory, a hard disk drive, etc.) or a volatile memory (such as a RAM)

Figure 3:
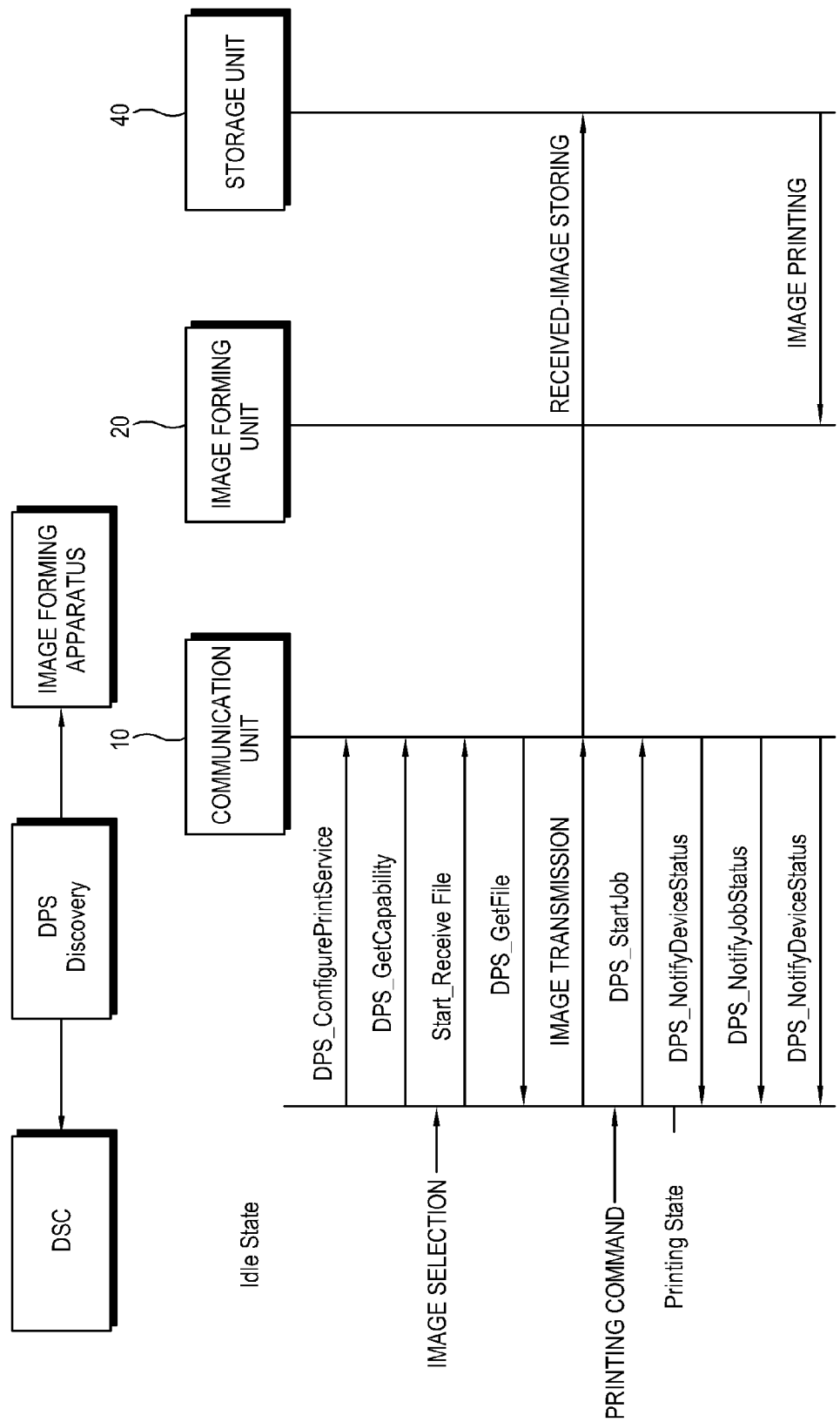
FIG. 3 illustrates operations of an image forming apparatus according to an embodiment of the present invention.

FIG. 3 illustrates operations of an image forming apparatus according to an embodiment of the present invention. Referring to FIG. 3, to use the PictBridge protocol to print an image, the image storage device 200 checks whether the image forming apparatus 100 connected to the image storage device 200 supports the PictBridge protocol. This check may be performed by calling a digital photo solutions (DPS)_Discovery function.

Then, a DPS_ConfigurePrintService function is executed to inform the image forming apparatus 100 that the digital still camera functions as a server while storing the image data, and functions as a client while printing the image. On the other hand, the image forming apparatus 100 functions as a server while performing the printing, and functions as a client while receiving the stored image data.

Then, the image storage device 200 requests information on a supported print option from the image forming apparatus 100. At this time, a user can check the print option supported by the image forming apparatus 100 through a user interface (UI) of the image storage device 200, which can be performed by executing a DPS_GetCapability function.

Then, if a user selects an image to be printed, the image storage device 200 calls a Start_ReceiveFile function and informs the image forming apparatus 100 that a user has selected the image to be printing. When the image forming apparatus 100 requests from the image storage device 200 information about the image selected by a user and the image data corresponding to the selected image (DPS_GetFileInfo and DPS_GetFile), the image storage device 200 transmits the image data corresponding to the selected image to the image forming apparatus 100. The image forming apparatus 100 receives the image data from the image storage device 200 and stores the received image data in the storage unit 40.

When a user completes a print option selection and inputs a print start command to the image storage device 200, the image storage device 200 calls a DPS_StartJob function. At this time, the image forming apparatus 100 already received at least a portion of the image data corresponding to the selected image before the user completed the print option selection, thereby reducing a user's waiting time when printing the selected image.

If the user inputs the print start command to the image forming apparatus 100 while the image storage device 200 is transmitting the image data corresponding to the selected image to the image forming apparatus 100, the image forming apparatus 100 may stop receiving the image data, print the already received image data, and then resume a reception of the rest of the image data corresponding to the one or more selected images.

While the printing is in progress, the image forming apparatus 100 may notify the image storage device 200 of a status of the image forming apparatus 100 and status of the print job, for example, by executing DPS_NotifyDeviceStatus and DPS_NotifyJobStatus functions, respectively. Here, the status of the image forming apparatus 100 may include a toner state, a print medium state, etc., and the status of the print job may include an image data transmission state, a print option transmission state, a state of progress of printing the received image data depending on the print option, a print completion, an error message, etc. Furthermore, the image forming apparatus 100 may include a user interface (UI) generator (not shown) and a display unit (not shown) so as to display such statuses. While in the present description, the image is selected through the user interface (UI) of the image forming apparatus 200, it is understood that aspects of the present invention are not limited thereto. For example, the image may be selected through a user interface (UI) provided on the image forming apparatus 100.

In this case, the image forming apparatus 100 may ask a user whether to maintain the connection between the image forming apparatus 100 and the image storage device 200 or to disconnect the image forming apparatus 100 from the image storage device 200. If a user selects to disconnect, the image storage device 200 is disconnected from the image forming apparatus 100.

According to aspects of the present invention, a user may select one image and set up the print option corresponding to the selected image, or select a plurality of images and collectively set up the print option corresponding to the plurality of selected images. In the latter case, the image data corresponding to the plurality of images may be transmitted from the image storage device 200 to the image forming apparatus 100 in sequence before completing the print option setup for the plurality of images.

Figure 4:
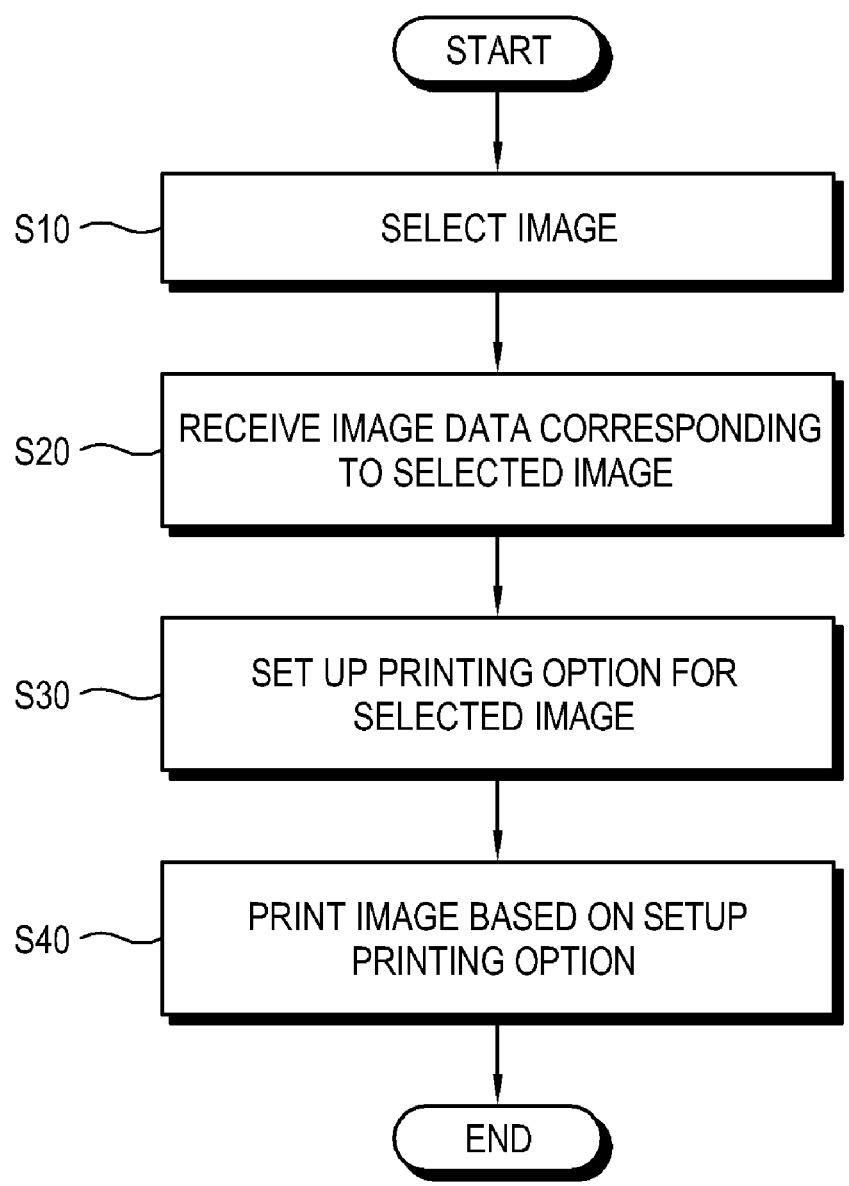
FIG. 4 is a flowchart of an image forming method according to an embodiment of the present invention.

FIG. 4 is a flowchart of an image forming method according to an embodiment of the present invention. Referring to FIG. 4, at least one image stored in the image storage device 200 is selected at operation S10. Here, the selection of the image may be achieved through the image forming apparatus 100 and/or the image storage device 200. Before selecting the at least one image (operation S10), a user may check the print options that are supported by the image forming apparatus 100 among the print options supported by the image storage device 200.

At operation S30, a user sets up the print option with regard to the at least one selected image. Meanwhile, at operation S20, the image data corresponding to the image selected at the operation S10 is transmitted from the image storage device 200 to the image forming apparatus 100 before the user begins to set up the print option or before the user finishes setting up the print option. Accordingly, it is possible to reduce a user's waiting time for the printing.

Meanwhile, if a user gives a print start command to the image forming apparatus 100 while the image data is transmitted (operation S20), the image begins to print according to the print start command, and then the transmission of the image data is resumed.

At operation S40, the image forming apparatus 100 prints the received image according to the print option set up at operation S30. The image forming apparatus may notify the image storage device of the status of the print job for the current image data, such as an image data transmission status, a print option transmission status, a state of progress of printing the received image data depending on the print option, a print completion status, an error message, etc. Furthermore, the image forming apparatus 100 may display the status of the print job.

Also, the image forming apparatus 100 may ask a user whether to maintain a connection between the image forming apparatus 100 and the image storage device 200 or to disconnect the image forming apparatus 100 from the image storage device 200. If a user selects to disconnect, the image storage device 200 is disconnected from the image forming apparatus 100.

As described above, aspects of the present invention provide an image forming apparatus and an image forming method in which image data is transmitted before completely setting a print option of an image corresponding to the image data, thereby reducing a user's waiting time for printing. Aspects of the present invention also provide an image forming apparatus and an image forming method in which a printing state of an image is provided to an image storage unit.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of forming an image using an image forming apparatus, the method comprising:
   selecting at least one image stored in an image storage device;
   setting up print options for the selected at least one image;
   starting a transmission of image data corresponding to the selected at least one image from the image storage device to the image forming apparatus, before the setting up of the print options is completed; and
   printing the image data according to the setup print options.

2. The method as claimed in claim 1, wherein the image data is printed directly from the image storage device, without the image storage device being connected to a host system or another terminal.

3. The method as claimed in claim 1, further comprising:
   notifying the image storage device of a print job status while printing of the image data is in process, the print job status including an image data transmission state of the image data corresponding to the selected at least one image.

4. The method as claimed in claim 1, further comprising:
   displaying a print job status on the image forming apparatus while the printing of the image data is in progress, the print job status included an image data transmission state of the image data corresponding to the selected at least one image.

5. The method as claimed in claim 1, further comprising:
   pausing the transmission of the image data when a print start command is input during the transmission, of the image data.

6. The method as claimed in claim 5, wherein the printing of the image data comprises:
   printing a transmitted portion of the image data while the transmission of the image data is paused,
   wherein the transmission of the image data resumes after the printing of the transmitted portion is completed.

7. The method as claimed in claim 1, further comprising:
   pausing the transmission of the image data when the setting up of the print options is completed.

8. The method as claimed in claim 7, wherein the printing of the image data comprises:
   printing a transmitted portion of the image data while the transmission of the image data is paused,
   wherein the transmission of the image data resumes after the printing of the transmitted portion is completed.

9. The method as claimed in claim 1, further comprising:
   prompting a user to determine whether to maintain a connection between the image storage device and the image forming apparatus.

10. The image forming method as claimed in claim 9, further comprising:
    terminating, according to a user selection from the prompt, the connection between the image storage device and the image forming apparatus.

11. The image forming method as claimed in claim 1, further comprising:
    executing, before the selecting of the at least one image, a function to determine what print options are supported by the image forming apparatus from among print options supported by the image storage device.

12. The method as claimed in claim 1, wherein the image data transmission from the image storage device to the image forming apparatus is carried out through a PictBridge protocol.

13. The method as claimed in claim 1, wherein the transmission of the image data corresponding to the selected at least one image starts immediately after the at least one image is selected.

14. The method as claimed in claim 1, wherein the selected at least one image includes a plurality of images, and the image data corresponding to the selected plurality of images is transmitted in a sequence according to image, the sequential transmission starting before completing the print option setup for the plurality of images.

15. The method as claimed in claim 14, wherein the sequential transmission of the image data starts immediately after at least one image is selected.

16. An image forming apparatus comprising:
    a communication unit configured to receive image data for at least one image stored in an image storage device and is selected to be printed;
    an image forming unit configured to print the received image data; and
    a controller configured to
    control the communication unit to start to receive the image data corresponding to the selected at least one image from the image storage device before print options for the at least one image are completely set up, and control the image forming unit to print the received image data according to the setup print options.

17. The image forming apparatus as claimed in claim 16, wherein the image forming unit is further configured to print the image data directly from the image storage device without the image storage device being connected to a host system.

18. The image forming apparatus as claimed in claim 16, wherein the controller is further configured to notify the image storage device of a print job status while the printing of the image data is in progress, the print job status including an image data transmission state of the image data corresponding to the selected at least one image.

19. The image forming apparatus as claimed in claim 16, the controller is further configured to display a print job status on the image forming apparatus while the printing of the image data is in progress, the print job status including an image data transmission state of the image data corresponding to the selected at least one image.

20. The image forming apparatus as claimed in claim 16, wherein the controller is further configured to control the communication unit to pause the receiving of the image data when a print start command is input while the image data is being received, control the image forming unit to print a received portion of the image data while the receiving of the image data is paused, and control the communication unit to resume the receiving of the image data after the image forming unit prints the received portion of the image data.

21. The image forming apparatus as claimed in claim 16, wherein the controller is further configured to prompt a user to determine whether to maintain a connection between the image storage device and the image forming apparatus.

22. The image forming apparatus as claimed in claim 21, wherein the controller is further configured to terminate, according to a user selection from the prompt, the connection between the image storage device and the image forming apparatus.

23. The image forming apparatus as claimed in claim 16, wherein the controller is further configured to transmit information on supported print options to the image storage device, to determine what print options are supported by the image forming apparatus from among print options supported by the image storage device before the at least one image is selected to be printed.

24. The image forming apparatus as claimed in claim 16, wherein the controller is further configured to control the communication unit to start to receive the image data corresponding to the selected at least one image immediately after the at least one image is selected to be printed.

25. An image forming system comprising:

an image storage device to store image data for at least one image selected to be printed; and an image forming apparatus to print the image data, the image forming apparatus comprising:

a communication unit to receive the image data from the image storage device, an image forming unit to print the received image data, and a controller to control the communication unit to start to receive the image data corresponding to the selected at least one image from the image storage device before print options for the at least one image are completely set up, and to control the image forming unit to print the received image data according to the setup print options.

26. The image forming system as claimed in claim 25, wherein the image forming apparatus receives the image data from the image storage device through a PictBridge protocol.

* * * * *

UNITED STATES PATENT AND TRADEMARK OFFICE
CERTIFICATE OF CORRECTION

PATENT NO. : 8,325,360 B2
APPLICATION NO. : 12/266747
DATED : December 4, 2012
INVENTOR(S) : Seung-wook Hong et al.

It is certified that error appears in the above-identified patent and that said Letters Patent is hereby corrected as shown below:

In the Claims:

Column 8; Line 9; In Claim 5, delete "transmission," and insert -- transmission --, therefor.

Signed and Sealed this
Fourteenth Day of May, 2013

Teresa Stanek Rea
*Acting Director of the United States Patent and Trademark Office*